March 19, 1935.  W. L. SMITH ET AL  1,994,878

ARTIFICIAL BAIT

Filed April 20, 1933

Inventors
Worden L. Smith and
Andrew A. Dietz
by
Attorney

Patented Mar. 19, 1935

1,994,878

UNITED STATES PATENT OFFICE 1,994,878

ARTIFICIAL BAIT

Worden L. Smith and Andrew A. Dietz, Jackson, Mich., assignors of one-third to Cedric Cook, Jackson, Mich.

Application April 20, 1933, Serial No. 667,070

6 Claims. (Cl. 43—35)

Our invention relates to improvements in artificial bait of the weedless type.

The primary object of the invention is to provide an artificial bait which maintains its weedless characteristics under all conditions to which an article of this kind is subjected, yet is effective in its operation and may be inexpensively constructed.

Other objects reside in the novel details of construction and arrangement and combination of parts as will be more fully related. The invention is clearly defined in the appended claims.

In the drawing wherein a preferred form of the invention is disclosed for the purpose of illustration, Fig. 1 is a side elevational view partly shown in broken cross section with the hooks concealed.

Figure 1:
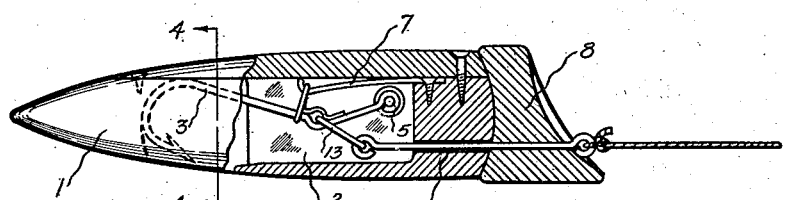

Having reference to the drawing, a body portion 1 has a chamber 2 within which hooks 3 are normally concealed. The hooks 3 are shown as guided and separated by a partition 4. Obviously, a single hook may be employed if desired and we do not intend to limit our invention to any particular hook structure. The shank of the hooks is loosely pivoted at 5 upon a transverse shaft 6. Resilient means preferably including a cantilevered spring 7 are employed to continuously urge the hooks 3 into the position shown in Fig. 1.

The head 8 of the bait is recessed at 9 to normally receive the rounded oblong end 10 of the body 1. This construction prevents weeds and the like from engaging the end of the body and at the same time the parts are held against twisting when in abutting relationship. The body 1 and head 8 are relatively movable upon the strike of the fish with draw bar connections affixed to the head and operatively connected to the hooks 3. As illustrated, these connections consist of a member 11 affixed to the head 8 and projecting through a passage 12 into the chamber 2 where it is operatively connected to the hooks 3 through a link 13 having a swiveled connection therewith.

Figure 2:
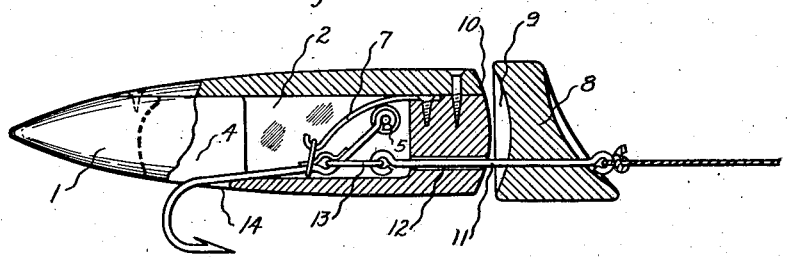
Fig. 2 is a view similar to Fig. 1 with the head and body separated and the hooks in an operative position.
Figure 3:
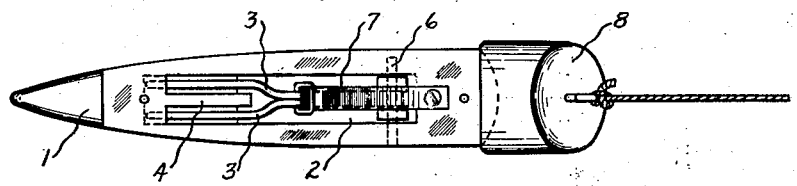
Fig. 3 is a top view with the top plate removed.
Figure 4:
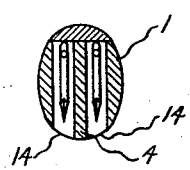
Fig. 4 is a cross sectional view taken on line 4—4 of Fig. 1.

Upon the strike of the fish, the body 1 will be moved relative to the head and hooks 3 will be pivoted about the shaft 6, as a result of the shortening of the draw bar connections, to project the hooks out of the body through openings 14 into an operative position as shown in Fig. 2.

It is to be noted that there is a direct pull upon the hooks 3 through the connections 11—13 when the hooks are in the operative position.

From the foregoing description, it will be readily apparent that we have provided a weedless bait in which resistance of the water during the reeling in operation or during trolling is entirely directed against the head and has no tendency to throw the hooks into an operative position. This is equally true with reference to weeds or other obstacles that may be encountered as the bait is traversed. Furthermore, if the bait is used in casting, although the inertia of the body may throw the hooks out in an operative position, upon striking the water, the spring 7 will draw the hooks back into the chamber 2 and the head and body into abutting relationship. Thus all resistance against the body is removed which would otherwise necessarily have to be overcome by the tension of the spring 7; the spring may be relatively light thus making the projection of the hooks 3 into an operative position very sensitive to the strike of a fish.

Although the hooks are preferably pivoted in the body, other methods of concealing and projecting the hooks may be employed within the spirit of our invention which is primarily concerned with the direct actuation of the hooks through relative movement of the body and head; the head acting to shield the body from the resistance offered to traverse of the bait. Also, we do not limit ourselves to the employment of a single spring to retain the body and head in normal abutting relationship and to urge the hooks into an inoperative position. A separate spring may be used solely for retaining the body and head in a normal abutting position.

Obviously changes and modifications will be readily suggested by the disclosure to those skilled in the art and for this reason we do not desire to be limited by the specific details herein illustrated and described, but intend to include as part of our invention all such changes and modifications of the above character as fall within the scope of the appended claims.

We claim:

1. In an artificial bait, the combination with a body portion of a head portion against which the pressure of the water is directed as the bait is traversed, a hook having a shank associated with said body, resilient means located in said body operatively connected to said shank to normally retain said hook in an inoperative position, a member affixed to said head and operatively connected to said hook to render the same operative upon relative movement of said head and body, said means also acting to normally retain such body and head portions in abutting relationship.

2. In an artificial bait, the combination with a body portion, of a head portion movable relative to said body against which the pressure of the water is directed as the bait is traversed, a hook pivoted in said body and normally concealed therein, means affixed to said head and movable relative to said body linked to said hook, said means upon relative movement between said head and body swinging said hook upon its pivot to an operative position, and a leaf spring continuously acting to retain said hook within said body and to resist relative movement of said head and body.

3. In an artificial bait, the combination with a body portion, of a head portion movable relative to said body against which the pressure of the water is directed as the bait is traversed, a hook having a shank pivoted in said body and normally concealed therein, means affixed to said head and movable relative to said body operatively connected to the shank of said hook, said means upon relative movement between said head and body swinging said hook upon its pivot to an operative position, and a leaf spring linked to and continuously acting to retain said hook within said body.

4. In an artificial bait, the combination with a body portion, of a head portion normally in abutting relationship with said body and against which the pressure of the water is directed as the bait is traversed, a hook normally concealed in said body, direct linked connections between said hook and said head, said connections upon relative movement of said head and body moving said hook to an operative position, and resilient means normally retaining said hook concealed and acting through said connections to hold said head and body in abutting relationship.

5. In an artificial bait, the combination of a body portion, a head portion movable relatively to said body and against which the pressure of the water is directed as the bait is traversed, a hook having a shank pivoted in and at one side of said body, and normally concealed therein, means affixed to said head and disposed for longitudinal movement in said body, operatively connected to said shank, said means upon relative movement between said head and said body swinging said hook to an operative position, and means connected to said shank tending to retain said hook within said body.

6. In an artificial bait, the combination of a body portion, a head portion movable relatively to said body portion and against which the pressure of the water is directed as the bait is traversed, a hook having a bent shank pivoted in and at one side of said body and normally concealed therein, means affixed to said head and disposed for longitudinal movement in said body, operatively connected to the vertex of said bent shank, said means upon relative movement between said head and said body swinging said hook to an operative position and means tending to retain said hook within said body.

ANDREW A. DIETZ.
WORDEN L. SMITH.